May 2, 1950 T. H. WOODFIELD ET AL 2,506,404
SHAFT BEARING
Filed May 17, 1947
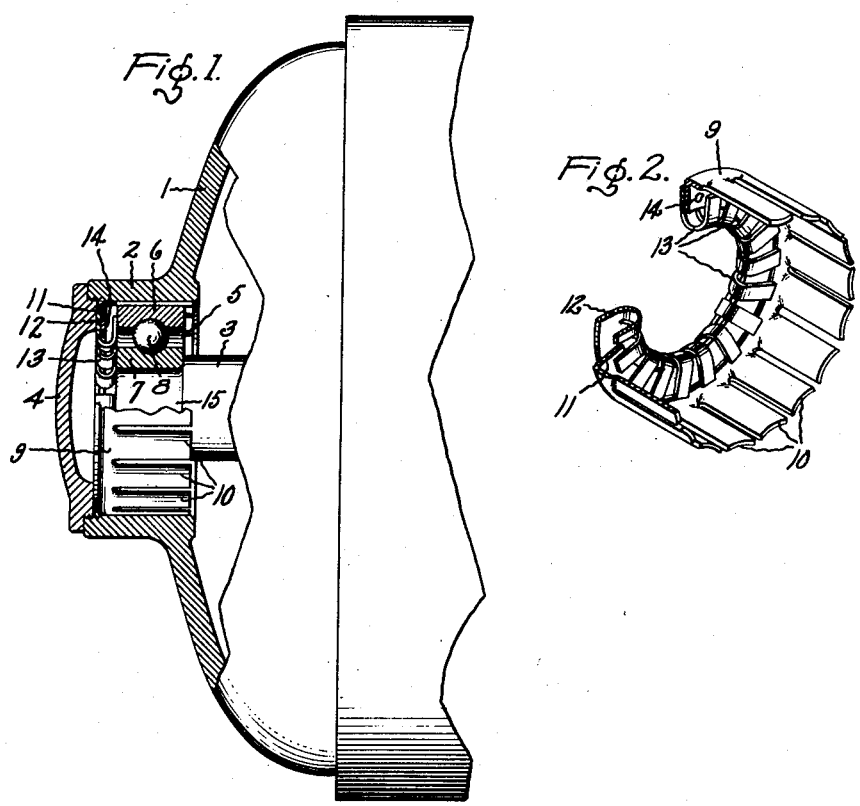
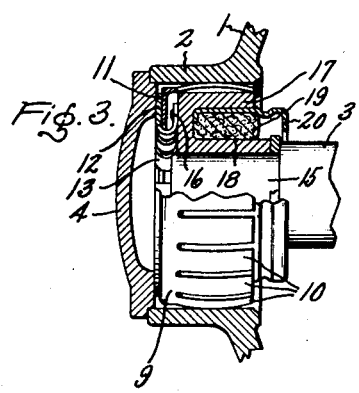
Inventors:
Thomas H. Woodfield,
Cecil J. Morton,
By Prowell P. Mack
Their Attorney Patented May 2, 1950

2,506,404

UNITED STATES PATENT OFFICE 2,506,404

SHAFT BEARING

Thomas H. Woodfield, Birmingham, and Cecil J. Morton, Coventry, England, assignors to General Electric Company, a corporation of New York Application May 17, 1947, Serial No. 748,698
In Great Britain August 1, 1946

9 Claims. (Cl. 308—184)

This invention relates to mountings for shaft bearings and includes an arrangement to insure the requisite fit of a bearing within a supporting housing and to prevent excessive end-play of the bearing.

In the construction of bearing assemblies in which a bearing is located in a supporting structure or housing, it is desirable to provide a fit of the bearing in its housing which will allow the bearing limited axial movement to accommodate end-play of the shaft and yet not allow the bearing to creep circumferentially in the housing. This requires very close tolerances in the machining of the diameters of both the bearing and the interior of the housing and often necessitates selective assembly.

This invention is an improvement of our co-pending application Serial Number 631,712, filed November 29, 1945, assigned to the assignee of the present application.

It is an object of this invention to provide an improved bearing assembly for rotating apparatus.

Another object of this invention is to provide an improved bearing assembly wherein the requisite fit is provided for the bearing within a supporting housing without requiring that the diameters of these elements be kept to close tolerances.

A further object of this invention is to provide an improved bearing assembly in which both axial and radial pressure is exerted on a bearing within a supporting housing to allow a limited axial movement of the bearing and to prevent its rotation within the housing with a minimum of noise and vibration.

Further objects and advantages of this invention will become apparent and this invention will be better understood from the following description referring to the accompanying drawing and the features of novelty which characterize this invention will be pointed out with particularity in the claims annexed to and forming a part of this specification.

A feature of this invention is the provision of a resilient adapter for use in mounting an anti-friction or sleeve bearing in a supporting housing or like structure. The adapter may comprise a resilient cap member adapted to be fitted in an opening in the structure and formed with resilient fingers or projections which engage a circumferential surface of the bearing housing and the outer surface of the bearing for exerting radial pressure to prevent circumferential creepage of the bearing, and separately formed resilient fingers adapted to be applied to and held in place by the cap member so as to form a unitary structure therewith and serving to provide axial pressure on the end of the bearing when the adapter is fitted in the housing.

In the drawing, Fig. 1 is a side elevational view, partly in section, of an embodiment of this invention incorporated with an anti-friction bearing on a dynamoelectric machine. Fig. 2 is a view in perspective of the embodiment of Fig. 1 and showing one form of the resilient fingers. Fig. 3 illustrates this invention applied to a sleeve bearing and further illustrates another form of the resilient fingers.

Referring to the drawing, there is shown a dynamoelectric machine having end-shield 1, bearing housing 2, and a rotatable shaft 3. End plate 4 serves as an end wall for the housing 2 and may be suitably secured in place with a threaded connection as shown in Fig. 1 or with a press fit as shown in Fig. 3. Positioned in the housing and spaced axially from the end wall 4 is an anti-friction bearing generally identified as 5 and having an outer race 6, an inner race 7, and a plurality of anti-friction bearing elements 8 interspaced therebetween. As in the conventional construction, the inner bearing race 7 may be press-fitted on shoulder 15 of shaft 3. While a ball bearing is illustrated, it will be readily apparent that other types of anti-friction bearing such as a roller bearing can be utilized in this construction.

In order to secure the requisite fit between the bearing and the housing without requiring close tolerances in the respective diameters, and to suitably cushion end-play of the bearing, the arrangement now to be described is provided. A resilient cap member, generally identified as 9, is interposed between the bearing housing and the outer bearing race 7. This cap is formed of a washer of suitable resilient material such as resilient sheet steel and having a central annular portion 11 and a plurality of radially extending resilient spring fingers 10 originally punched or otherwise formed from a blank of the resilient material. These fingers or projections constitute the resilient portion of the cap member and are bent over to form an annular flange extending substantially at right angles to the annular washer portion 11, as shown in Fig. 2. The annular portion of the cap is positioned in the opening between end wall 4 and the bearing 5 and the fingers are fitted over the outer periphery of the outer race 6 so that they engage the outer surface of the outer race and the inner circumferential surface of housing 2. The fingers 10, thus formed integrally with the washer portion 11, may be curved circumferentially, i. e. having a curved cross-section, as shown in Fig. 2, or may be curved longitudinally along their longer dimension, as shown in Fig. 3. Thus, suitable points of engagement are made with the outer race of the bearing and the housing, and the machining of the inner surface of the housing and the outside diameter of the outer bearing race can be maintained at ordinary commercial tolerances since the resilience of the spring fingers 10 will take up any inaccuracies and apply uniform pressure around the entire periphery of the bearing preventing circumferential creepage thereof.

The adapter thus far described is generally similar to that disclosed in our co-pending application Serial Number 631,712, referred to above. However, it may be desirable in the construction of the adapter to provide considerable latitude in the degree of resiliency chosen for the fingers applying radial pressure on the bearing and the fingers applying axial pressure on the bearing. Difficulty occurs in selecting appropriate spring strengths for the respective radially-acting and axially-acting spring fingers if they are both formed from the same blank of resilient material. Therefore, in order to permit the axially-acting fingers to possess a different resilience than the radial fingers, a separate member is provided which is in the form of a resilient washer 12 applied to the exterior of the cap member at its base and having resilient spring fingers or projections 13 extending radially inward from its aperture. The inner peripheries of these fingers are bent over so as to overlay, but in spaced relation to the interior surface of the cap member at its base, i. e. the annular portion 11. This arrangement is best shown in Fig. 2 of the drawing. Referring again to Fig. 1, it will be seen that the washer 12 engages the end wall 4 of housing 2 and the annular portion 11 of cap 9 bears against this washer. The overlaying fingers 13 in turn engage the end wall of outer bearing race 6 applying axial pressure thereto sufficient to take up any slackness of fit of the balls 8 between the inner race 7 and outer race 6 to reduce bearing noise and vibration to a minimum and to cushion end-play of the shaft. In this way, the overlaying spring fingers 13 are formed separately from the radially-acting fingers 10.

The bending over of spring fingers 13 may in itself cause the two components of the adapter cap 9 and washer 12, to be held together, however, they may be suitably secured by means such as welding or riveting. In order to protect the axially-acting fingers 13 from excessive compression, small projections may be formed on the underlying portions of the fingers 13 or the underlying surface of the annular portion 11 of cap 9. These projections are shown at 16 in Fig. 3 and 14 in Fig. 1, respectively.

Referring now to Fig. 3, there is shown the application of this invention to a sleeve bearing. Here, like parts are designated with like numbers. The sleeve bearing 17 is shown formed with a recess 18 in which absorbent packing material 19 is positioned. Cap member 20 serves to retain the packing in the recess 18. This bearing is arranged to accommodate the journal surface of the shaft in free working relation. The radially-acting fingers 10 and axially-acting fingers 13 function in the manner described above to apply radial pressure to prevent circumferential creepage of the bearing and to cushion end-play of the shaft respectively.

It will now be readily understood that in the construction described above, the two initially separate members 9 and 12 respectively together with the resilient spring fingers 10 and 13 fashioned therefrom need not be formed of the same resilient material or of the same thickness. In this way, the adapter assembly can be designed to apply appropriate radial and axial pressure without limitations as to material. In addition, the adapter unit can be assembled as the last step in the assembly of the overall bearing construction since the bearing can be positioned on the shaft and in the housing prior to the fitting of the adapter.

While we have illustrated and described a particular embodiment of our invention, modifications thereof will occur to those skilled in the art. We desire it to be understood therefore that our invention is not to be limited to the particular arrangements disclosed and we intend in the appended claims to cover all modifications which do not depart from the spirit and scope of our invention.

What we claim as new and desire to secure by Letters Patent of the United States is:

1. A bearing assembly comprising, a housing member, a bearing positioned in said housing member and spaced from an end wall thereof, a resilient cap member positioned in the opening between said end wall and said bearing and having resilient spring fingers engaging a circumferential surface of said housing and the outer surface of said bearing for applying radial pressure thereto, and a resilient washer engaging said end wall, said cap member having an annular portion bearing against said washer, said washer having resilient spring fingers overlaying said annular portion of said cap member and spaced therefrom and engaging an end wall of said bearing for applying axial pressure thereto.

2. A bearing assembly comprising, a housing, a bearing positioned in said housing and including an outer race and an inner race with anti-friction bearing elements therebetween, said bearing being spaced from an end wall of said housing, a cap member having an annular portion positioned in the opening between said end wall and said bearing and having axially extending resilient spring fingers formed integrally therewith engaged between a circumferential surface of said bearing housing and the outer surface of said outer bearing race for applying radial pressure thereto, and a second member having an annular part abuttingly engaging the annular portion of said first member and including resilient spring fingers extending from the inner edge of said annular part, said fingers having their extremities bent outward at a region axially spaced from said annular part and engaging an end wall of said outer bearing race, said second member being interposed between said end wall of said housing and said end wall of said outer bearing race so that the resilience of said fingers maintains axial pressure on said outer bearing race.

3. A bearing assembly comprising, a housing, a bearing positioned in said housing and spaced from an end wall thereof, a cap member having an annular portion positioned in the opening between said end wall and said bearing and having axially extending resilient spring fingers formed integrally therewith engaged between a circumferential surface of said housing and the outer surface of said bearing for applying radial pressure thereto, and a second member having an annular part abuttingly engaging the annular portion of said first member and having resilient spring fingers connecting with the inner edge of said annular part and extending radially outward therefrom at a region axially spaced from said annular part, said second member being interposed between said end wall of said housing and an end wall of said bearing so that the resilience of said fingers maintains axial pressure on said bearing.

4. A bearing assembly comprising, a housing member, a bearing positioned in said housing and spaced from an end wall thereof, a cap member having an annular portion positioned in the opening between said end wall and said bearing and having a resilient portion engaging a circumferential surface of said housing and the outer surface of said bearing for applying radial pressure thereto, and a second member having an annular part and a resilient portion spaced axially from said annular part, said second member being interposed between said end wall of said housing and an end wall of said bearing whereby said resilient portion of said second member maintains axial pressure on said bearing.

5. A bearing assembly comprising, a housing member, a bearing positioned in said housing and spaced from an end wall thereof, a cap member positioned in the opening between said end wall and said bearing and having resilient spring fingers engaging a circumferential surface of said housing and the outer surface of said bearing for applying radial pressure thereto, and a washer member engaging said end wall, said cap member having an annular portion bearing against said washer member, said washer member having resilient spring fingers overlaying said annular portion of said cap member and spaced therefrom and engaging an end wall of said bearing for applying axial pressure thereto, said annular portion of said cap member having projections extending toward said fingers of said washer to prevent undue compression of said fingers.

6. A bearing assembly comprising, a housing member, a bearing positioned in said housing, and spaced from an end wall thereof, a cap member positioned in the opening between said end wall and said bearing and having resilient spring fingers engaging a circumferential surface of said housing and the outer surface of said bearing for applying radial pressure thereto, and a washer member engaging said end wall, said cap member having an annular portion bearing against said washer, said washer having resilient spring fingers overlaying said annular portion of said cap member and spaced therefrom and engaging an end wall of said bearing for applying axial pressure thereto, the overlaying portions of said fingers of said washer having projections extending toward said annular portion of said cap member to prevent undue compression of said fingers.

7. A bearing assembly comprising, a housing member, a bearing positioned in said housing and spaced from an end wall thereof, a cap member positioned in the opening between said end wall and said bearing and having resilient spring fingers engaging a circumferential surface of said housing and the outer surface of said bearing for applying radial pressure thereto, said fingers being of curved cross-section so as to apply equal pressure around the periphery of said bearing, and a washer member engaging said end wall, said cap member having an annular portion bearing against said washer, said washer having resilient spring fingers overlaying said annular portion of said cap member and engaging an end wall of said bearing for applying axial pressure thereto.

8. A bearing assembly comprising, a housing member, a bearing positioned in said housing and spaced from an end wall thereof, a cap member positioned in the opening between said end wall and said bearing and having resilient spring fingers engaging a circumferential surface of said housing and the outer surface of said bearing for applying radial pressure thereto, said fingers being curved in their longer dimension so as to apply equal pressure around the periphery of said bearing, and a washer member engaging said end wall, said cap member having an annular portion bearing against said washer, said washer having resilient spring fingers overlaying said annular portion of said cap member and engaging an end wall of said bearing for applying axial pressure thereto.

9. A bearing assembly comprising, a housing member, a sleeve bearing positioned in said housing and having its end wall spaced from an end wall of said housing, a cap member positioned in the opening between said end wall and said bearing and having resilient spring fingers engaging a circumferential surface of said housing and the outer surface of said bearing for applying radial pressure thereto, and a washer member engaging said end wall, said cap member having an annular portion bearing against said washer, said washer having resilient spring fingers overlaying said annular portion of said cap member and engaging said end wall of said bearing for applying axial pressure thereto.

THOMAS H. WOODFIELD.
CECIL J. MORTON.

REFERENCES CITED

The following references are of record in the file of this patent:

UNITED STATES PATENTS

| Number | Name | Date |
|---|---|---|
| 1,423,950 | Leon | July 25, 1922 |

FOREIGN PATENTS

| Number | Country | Date |
|---|---|---|
| 578,710 | France | Oct. 12, 1924 |